United States Patent
Samuthirapandian et al.

(10) Patent No.: US 9,864,194 B2
(45) Date of Patent: Jan. 9, 2018

(54) SYSTEMS AND METHODS FOR DISPLAYING FOV BOUNDARIES ON HUDS

(71) Applicant: HONEYWELL INTERNATIONAL INC., Morris Plains, NJ (US)

(72) Inventors: Subash Samuthirapandian, Tamilnadu (IN); John G. Suddreth, Cave Creek, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/950,245

(22) Filed: Nov. 24, 2015

(65) Prior Publication Data
US 2017/0146797 A1     May 25, 2017

(51) Int. Cl.
| G09G 5/00 | (2006.01) |
| G02B 27/01 | (2006.01) |
| G06F 3/01 | (2006.01) |
| G02B 27/00 | (2006.01) |

(52) U.S. Cl.
CPC ..... G02B 27/0101 (2013.01); G02B 27/0093 (2013.01); G02B 27/01 (2013.01); G02B 27/017 (2013.01); G02B 27/0179 (2013.01); G06F 3/013 (2013.01); G02B 2027/0141 (2013.01); G02B 2027/0181 (2013.01); G02B 2027/0183 (2013.01); G02B 2027/0187 (2013.01)

(58) Field of Classification Search
USPC .......................................................... 345/8
See application file for complete search history.

(56) References Cited

U.S. PATENT DOCUMENTS

| 5,585,813 A | 12/1996 | Howard |
| 7,961,117 B1 | 6/2011 | Zimmerman et al. |
| 9,041,623 B2 | 5/2015 | Liu et al. |
| 2002/0101568 A1 | 8/2002 | Eberl et al. |

(Continued)

FOREIGN PATENT DOCUMENTS

| DE | 102012022691 A1 | 5/2014 |
| DE | 102012218837 A1 | 6/2014 |
| WO | 2014040809 A1 | 3/2014 |

OTHER PUBLICATIONS

Arthur, J., et al., "Design and testing of an unlimited field-of-regard synthetic vision head-worn display for commercial aircraft surface operations," Researchgate, 2014.

(Continued)

Primary Examiner — Gustavo Polo
(74) Attorney, Agent, or Firm — Lorenz & Kopf, LLP

(57) ABSTRACT

A visual display system is provided for a vehicle having a windshield. The system includes a controller configured to receive information associated with an operating environment of the vehicle and to generate display commands representing the operating environment; a first operator tracking unit configured to collect data associated with a primary vision field of view of an operator; and a first display system coupled to the controller and configured to receive the display commands. The first display system includes a first display unit configured to display at least a portion of a border representing a boundary of the primary vision field of view of the operator and first symbology representing the operating environment of the vehicle.

19 Claims, 4 Drawing Sheets

(56) References Cited

U.S. PATENT DOCUMENTS

2009/0309812 A1* 12/2009 Larson ................. G02B 27/017
345/8

OTHER PUBLICATIONS

Bailey, R., et al. "Evaluation of Head-Worn Display Concepts for Commercial Aircraft Taxi Operations," NASA, Apr. 12, 2007.
Extended EP Search Report for Application No. 16197596.6-1504 dated Mar. 21, 2017.

* cited by examiner

SYSTEMS AND METHODS FOR DISPLAYING FOV BOUNDARIES ON HUDS

TECHNICAL FIELD

The present invention generally relates to aircraft visual display systems and methods.

BACKGROUND

Modern vehicles, such as aircraft, often include head-up displays (HUDs) that function to provide images and/or symbology on a transparent display such that it overlays the real-world elements in the environment viewed through the display. As such, HUDs enable a pilot or operator to view the exterior of the vehicle with enhancements from the information presented on the display. As an example, since the HUD is viewed with the surrounding scenery, such systems enable the pilot to view primary flight information in a manner that limits head-down time.

HUDs have been utilized in different forms. Traditionally, a "fixed" HUD includes a display that is incorporated into, or proximate to, the windshield of the aircraft. A near-to-eye (NTE) display is a HUD with a display in close proximity to the user's eye and in a fixed position relative to the user's head. As examples, NTE displays may include helmet-mounted-displays (HMDs), head-mounted-displays (also HMDs), or head-worn-displays (HWDs). Each type of HUD has advantages and drawbacks, and designers continue to develop improvements to aircraft display systems to enhance situational awareness, operational safety, and efficiency.

Accordingly, it is desirable to provide systems and methods to improve HUD systems. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a visual display system is provided for a vehicle having a windshield. The system includes a controller configured to receive information associated with an operating environment of the vehicle and to generate display commands representing the operating environment; a first operator tracking unit configured to collect data associated with a primary vision field of view of an operator; and a first display system coupled to the controller and configured to receive the display commands. The first display system includes a first display unit configured to display at least a portion of a border representing a boundary of the primary vision field of view of the operator and first symbology representing the operating environment of the vehicle.

In accordance with another exemplary embodiment, a method for providing a visual display to an operator of a vehicle having a windshield includes collecting information associated with an operating environment; determining a primary vision field of view of the operator based on data from a first operator tracking unit; and rendering, on a first display system, first symbology representing the operating environment of the vehicle and at least a portion of a border representing a boundary of the primary vision field of view of the operator.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide improved aircraft display systems, particularly head-up display (HUD) systems. Specifically, exemplary embodiments include at least one HUD system that displays a border or portion of a border that corresponds to a boundary of the primary vision field of view. As an example, the HUD systems may include a fixed HUD display system on a windshield of the aircraft and an NTE display system on the operator that cooperate to display flight symbology to the operator, including the border and/or border portions to improve the situational awareness of the operator regarding objects inside or outside the primary vision field of view.

Figure 1:
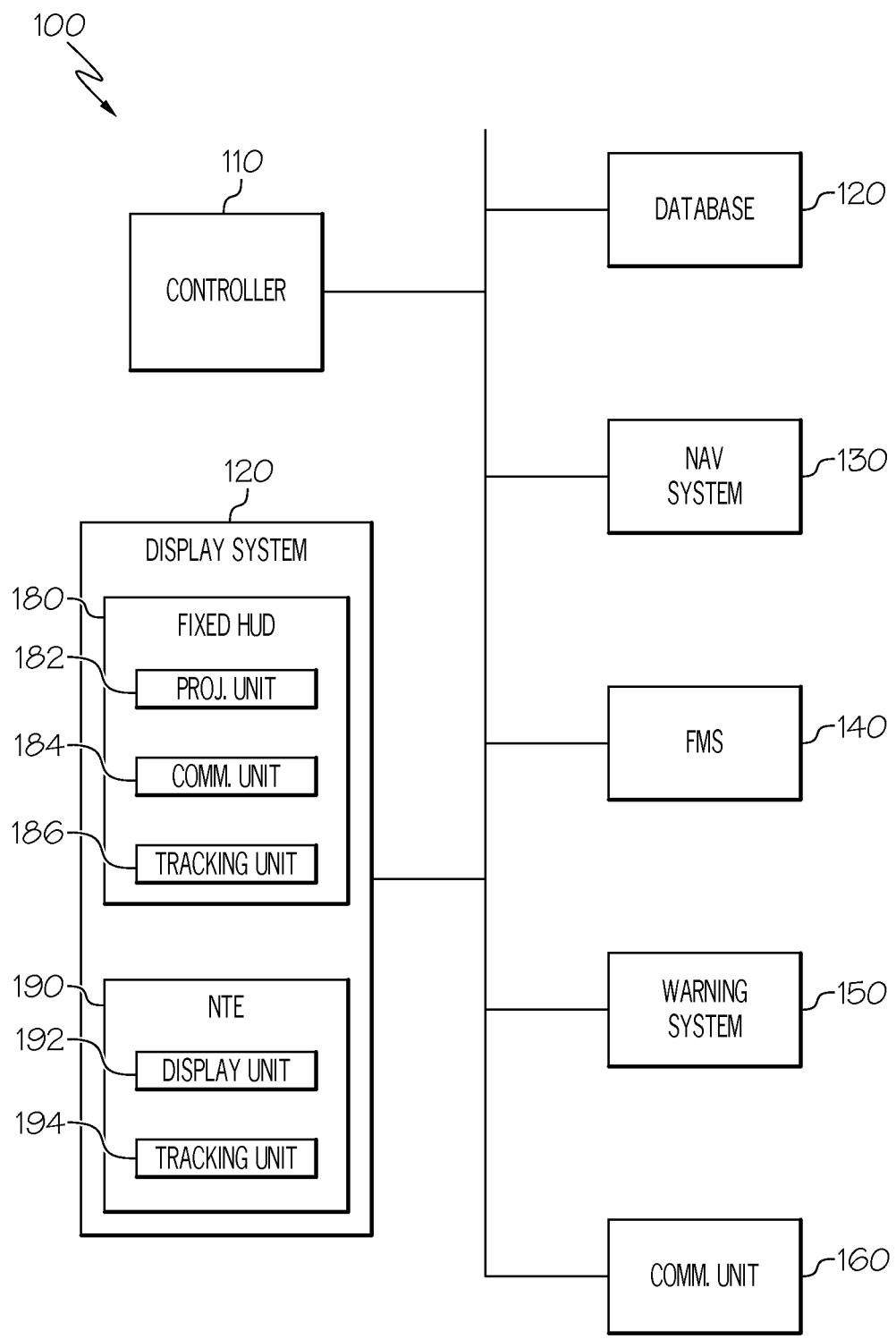
FIG. 1 is a schematic block diagram of an aircraft system in accordance with an exemplary embodiment.

FIG. 1 is a block diagram of an aircraft system 100 in accordance with an exemplary embodiment. It should be understood that FIG. 1 is a simplified representation of the system 100 for purposes of explanation and ease of description. Further exemplary embodiments of the system 100 may include additional or other devices and components for providing further functions and features. The system 100 can be utilized in an aircraft, such as a helicopter, airplane, or unmanned vehicle. Moreover, exemplary embodiments of the system 100 can also be utilized in spacecraft, ships, submarines, and other types of vehicles, including land vehicles such as automobiles. For simplicity, exemplary implementations are described below with reference to "aircraft" (or "own-ship aircraft" when discussing multiple aircraft) and an "operator", which may include any user, pilot, flight crew member, and/or external control operator.

As shown in FIG. 1, the system 100 includes a controller 110, a database 120, a navigation system 130, a flight management system 140, a warning system 150, a communications unit 160, and one or more display systems 170, which as described below may include a fixed head-up display (HUD) system 180 and a near-to-eye (NTE) display system 190. The elements of the system 100 may be coupled together in any suitable manner, such as with a wired and/or wireless data bus. Although the system 100 appears in FIG. 1 to be arranged as an integrated system, the system 100 is not so limited and can also include an arrangement whereby one or more aspects of the system 100 are separate components or subcomponents of another system located either onboard or external to the aircraft. Additional details about the operation of the system 100 are provided below after a brief introduction of the components of the system 100.

The controller 110 includes a computer processor associated with any applicable aircraft system (e.g., including the flight management system 140 or a separate system). In one exemplary embodiment, the controller 110 functions to at least receive and/or retrieve aircraft management information (e.g., from the flight management system 140), navigation and control information (e.g., from the navigation system 130), and airport, landing, target and/or terrain information (e.g., from the database 120, warning system 150, and/or communications unit 160). In some embodiments, among other functions and discussed in further detail below, the controller 110 may additionally calculate and generate display commands associated with the flight plan and/or flight or airport environment. As such, the controller 110 may function as a graphics display generator to generate display commands based on algorithms or other machine instructions stored in the controller 110 or in separate memory components. The controller 110 then sends the generated display commands to one or more of the display systems 170 for presentation to the operator, as described in greater detail below.

Depending on the embodiment, the controller 110 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the controller 110 includes memory and/or processing logic that may be configured to carry out the functions, techniques, and processing tasks or methods associated with operation of the system 100. The computer readable instructions, firmware and software programs are tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks.

Although not shown, the controller 110 may include a user interface coupled to the controller 110 to allow a user to interact with the system 100. The user interface may be realized as a touchscreen, keypad, touchpad, keyboard, mouse, touch panel, joystick, knob, line select key or another suitable device adapted to receive input from a user. In further embodiments, the user interface is realized as audio input and output devices, such as a speaker, microphone, audio transducer, audio sensor, or the like.

Database 120 is coupled to controller 110 and can be a memory device (e.g., non-volatile memory, disk, drive, tape, optical storage device, mass storage device, etc.) that stores digital airport, landing, waypoint, target location, and terrain data as either absolute coordinate data or as a function of aircraft position that enables the construction, maintenance, and modification of a synthetic or enhanced representation of the aircraft operating environment. Data in the database 120 may be uploaded prior to flight or received from external sources, such as an airport transmitter or onboard sensors.

The navigation system 130 is configured to provide the controller 110 with real-time navigational data and/or information regarding operation of the aircraft. The navigation system 130 may include or cooperate with a global positioning system (GPS), inertial reference system (IRS), Air-data Heading Reference System (AHRS), or a radio-based navigation system (e.g., VHF omni-directional radio range (VOR) or long range aid to navigation (LORAN)). The navigation system 130 is capable of obtaining and/or determining the current state of the aircraft, including the location (e.g., latitude and longitude), altitude or above ground level, airspeed, pitch, glide scope, heading, and other relevant flight or operational information.

The flight management system 140 supports navigation, flight planning, and other aircraft control functions, as well as provides real-time data and/or information regarding the operational status of the aircraft. The flight management system 140 may include or otherwise access one or more of the following: a weather system, a radar system, an autopilot system, an auto-thrust system, a flight control system, hydraulics systems, pneumatics systems, environmental systems, electrical systems, engine systems, trim systems, lighting systems, electronic checklist systems, an electronic flight bag, and/or other suitable avionics systems. As examples, the flight management system 140 may identify operating states of the aircraft, such as engine operation and current aircraft configuration status, including information regarding the current flap configuration, aircraft speed, aircraft pitch, aircraft yaw, aircraft roll, and the like. Additionally, the flight management system 140 may identify or otherwise determine environmental conditions at or near the current location of the aircraft, such as, for example, the current temperature, wind speed, wind direction, atmospheric pressure, and turbulence. The flight management system 140 may also identify optimized speeds, distance remaining, time remaining, cross track deviation, navigational performance parameters, and other travel parameters. Although not shown, the navigation system 130 and/or flight management system 140 may include one or more sensors such as light sensors, infrared sensors, radar, lidar, sonar, and/or weather sensors that may provide information to the system 100.

The warning system 150 is considered to represent one or more systems that evaluate information regarding the surrounding environment and/or the aircraft and generate warnings for the operator when an issue poses a threat. As such, the warning system 150 may include or otherwise access an air traffic management system, a traffic avoidance system, a crew alerting system, terrain avoidance and warning system, and the like. In some embodiments, the warning system 150 may be part of the flight management system 140. As described in greater detail below, the warning system 150 may particularly generate warnings with respect to other aircraft and/or terrain in the vicinity of the own-ship aircraft and provide associated information to the controller 110 for presentation on one or more of the display systems 170.

The communications unit 160 may be any suitable device for sending and receiving information to and from the system 100. In some embodiments, communications unit 160 may be configured to receive radio frequency transmissions, satellite communication transmissions, optical transmissions, laser light transmissions, sonic transmissions or transmissions of any other wireless form of data link. In one exemplary embodiment, the communications unit 160 may include, for example, an automatic dependent surveillance-broadcast (ADSB) transceiver. In one exemplary embodiment, the communications unit 160 is configured to send and/or receive information from the airport and/or air traffic control. The controller 110 and/or communications unit 160 may include a communication management unit (CMU) to facilitate the sending and receipt of messages between the aircraft and air traffic control.

As noted above, the system 100 also includes one or more display systems 170 coupled to the controller 110. In general, the display systems 170 may include any device or apparatus suitable for displaying various types of computer generated symbols and flight information. Using data retrieved (or received) from the operator, database 120, navigation system 130, flight management system 140, warning system 150, and/or communications unit 160, the controller 110 executes one or more algorithms (e.g., implemented in software) for determining the position of the various types of desired information on the display systems 170. As noted above, the controller 110 then generates display commands representing this data, and sends display commands to the display systems 170. As examples described in greater detail below, the display systems 170 may include a fixed HUD system 180 and an NTE display system 190. In addition or as an alternative to the fixed HUD system 180 and/or NTE display system 190, the display systems 170 may include one or more non-see-through displays, such as a virtual window or a head-down display.

The fixed HUD system 180 includes a projection unit 182, a partially transparent and reflective combiner unit (or display unit) 184, and a HUD tracking unit (or operator tracking unit) 186. The projection unit 182 generates a projected image based on commands from the controller 110. The combiner unit 184 may include one or more lenses or treatments with a transparent or semi-reflective surface that capture the images from the projection unit 182 for display to the operator. The combiner unit 184 is generally mounted to the aircraft in a relatively fixed position. For example, the combiner unit 184 may be mounted on or incorporated into the aircraft windshield. In one exemplary embodiment, the fixed HUD system 180 includes the HUD tracking unit 186 that functions to determine the view of the operator. As such, the HUD tracking unit 186 may include one or more sensors that track the head and/or eye position of the operator to determine the position and orientation view of the operator. Generally, any sensor that allows the system to determine the head position of the operator and/or rotation relative to the operator body and surrounding environment, eye position, or other useful situational information may be employed. Such sensors may include GPS sensors, inertial measurement unit (IMU) sensors, depth sensors, cameras, eye tracking sensors, microphones, biometric sensors, and other types of sensors. The HUD tracking unit 186 may provide position, orientation, and other view information regarding the operator to the controller 110, as discussed in greater detail below. In some exemplary embodiments, the HUD tracking unit 186 may be omitted, particularly when the display systems 170 include the NTE display system 190, discussed below.

Generally, the fixed HUD system 180 may render any suitable type of information, particularly flight information. Examples include own-ship information such as navigational or operational symbology, including speeds, altitudes, pitch attitude, roll attitude, magnetic heading, magnetic track, altitude barometric correction setting, vertical speed displays, flight path and drift angles, flight director commands, limiting and operational speeds, mach number, radio altitude and decision height, final approach trajectory deviations, marker indications, and the like. Additionally, the fixed HUD system 180 may include traffic and/or terrain information, such as other aircraft in the vicinity and/or relevant terrain features in the immediate flight path. For some types of symbology, the position on the combiner unit 184 may be fixed, e.g., always in a particular place. For other types of symbology, such as traffic and terrain information, the display elements are a function of the real-world environment relative to the aircraft. As such, based on input from the database 120, navigation system 130, flight management system 140, warning system 150, and/or communications unit 160, the controller 110 functions to register and position this symbology in the appropriate position on the fixed HUD system 180. Additional functions and features of the fixed HUD system 180 are provided below.

The display systems 170 may further incorporate an NTE display system 190. The NTE display system 190 is generally worn by the operator, e.g., in the form of glasses, goggles, or helmet screen. The NTE display system 190 includes a display unit 192 and an NTE tracking unit (or operator tracking unit) 194. The display unit 192 is any suitable display component that displays computer-generated virtual images while still allowing the wearer to view the real world. For example, the display unit 192 may employ, for instance, any type of projection or micro-display technology on a transparent or semitransparent screen to provide the virtual images. Other technologies may also be employed, such as retinal displays in which images are projected directly onto the wearer's retina while the wearer is viewing the real world. The NTE tracking unit 194 functions to determine the view of the operator such that the display unit 192 provides the appropriate symbology for the current point of view. As such, the tracking unit 194 may include one or more internal or external sensors that provide positional and orientation data. Generally, any sensor that allows the system to determine the HMD wearer's head position and rotation relative to the operator body and surrounding environment, eye position, or other useful situational information may be employed. Such sensors may include GPS sensors, inertial measurement unit (IMU) sensors, depth sensors, cameras, eye tracking sensors, microphones, biometric sensors, and other types of sensors. In addition to the display unit 192 of the NTE display system 190, the NTE tracking unit 194 may provide position, orientation, and other view information regarding the operator to the controller 110, as discussed in greater detail below. The NTE tracking unit 194 may be incorporated with the HUD tracking unit 186 and/or omitted. The NTE display system 190 may display the same or different types of information as the fixed HUD system 180 discussed above in accordance with display commands from the controller 110 based on information from the operator, database 120, navigation system 130, flight management system 140, warning system 150, and communications unit 160.

Figure 2:
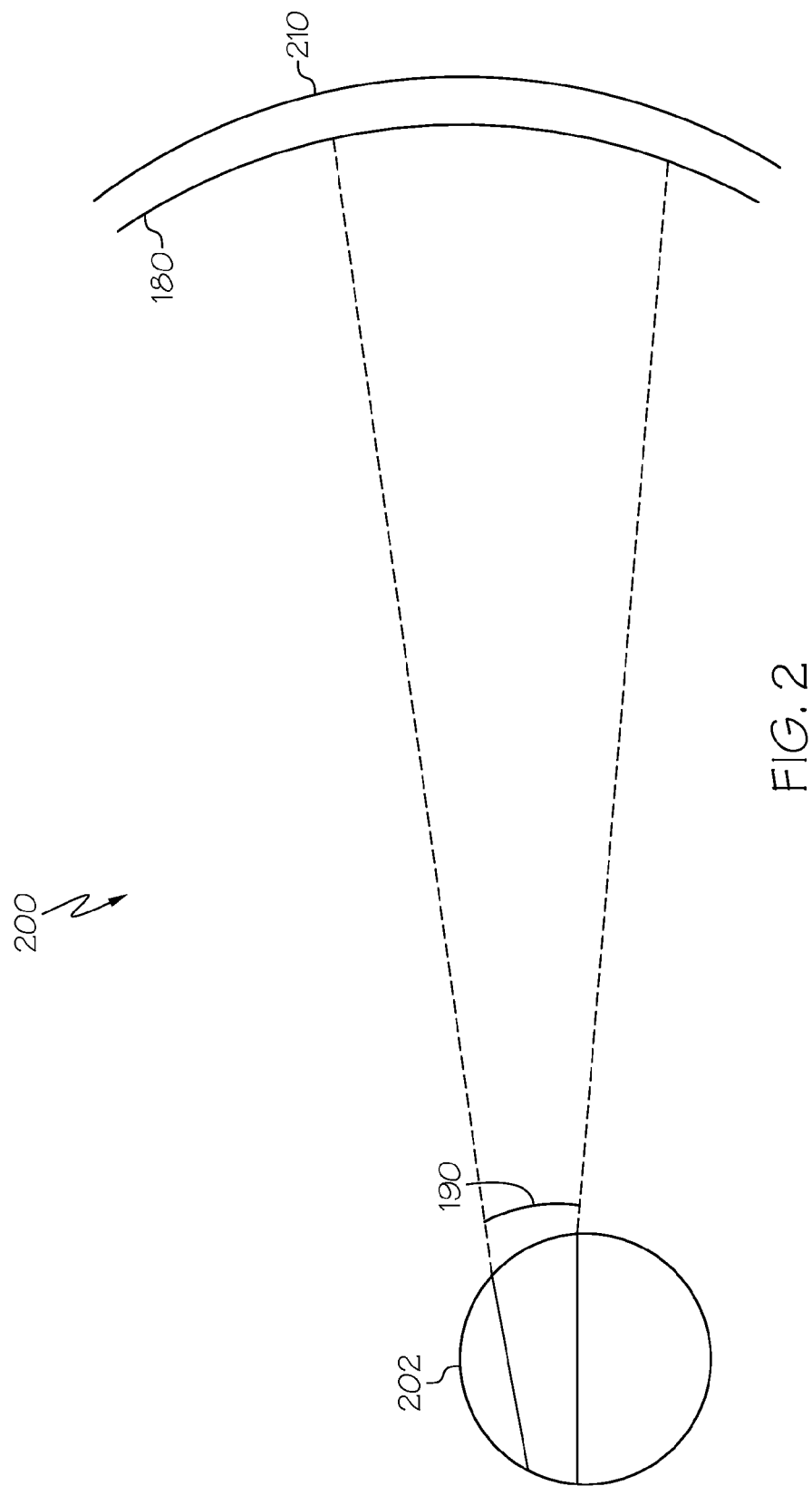
FIG. 2 is an exemplary environment for implementation of the aircraft system of FIG. 1 in accordance with an exemplary embodiment.

During operation, the display systems 170 may collectively and/or individually provide numerous types of information to the operator. In one exemplary embodiment, the fixed HUD system 180 and NTE display system 190 may be used in combination. As a brief example, reference is made to FIG. 2, which is a schematic diagram of an operator 200 wearing an NTE display system 190 within a cockpit incorporating a fixed HUD system 180 such that the operator 200 may utilize both systems 180, 190 simultaneously. In this example, the fixed HUD system 180 is at least partially mounted on the windshield 210 of the aircraft. In exemplary embodiments discussed below, the fixed HUD system 180 and NTE display system 190 may cooperate to provide enhanced information that would otherwise be unavailable on a single system. This is beneficial in that each type of display system 170 has advantages and disadvantages. For example, the fixed HUD system 180 provides a greater field of view but viewing the projected image on the combiner unit 184 may require the operator to maintain a straight and direct view into the windshield. The NTE display system 190 may accommodate for operator movement but has a more limited field of view. In some exemplary embodiments, the NTE display system 190 may be omitted, particularly when the fixed HUD system 180 includes the HUD tracking unit 186 that functions to provide operator view information to the controller 110. Exemplary embodiments discussed below may address these disadvantages while maintaining the advantages.

Figure 3:
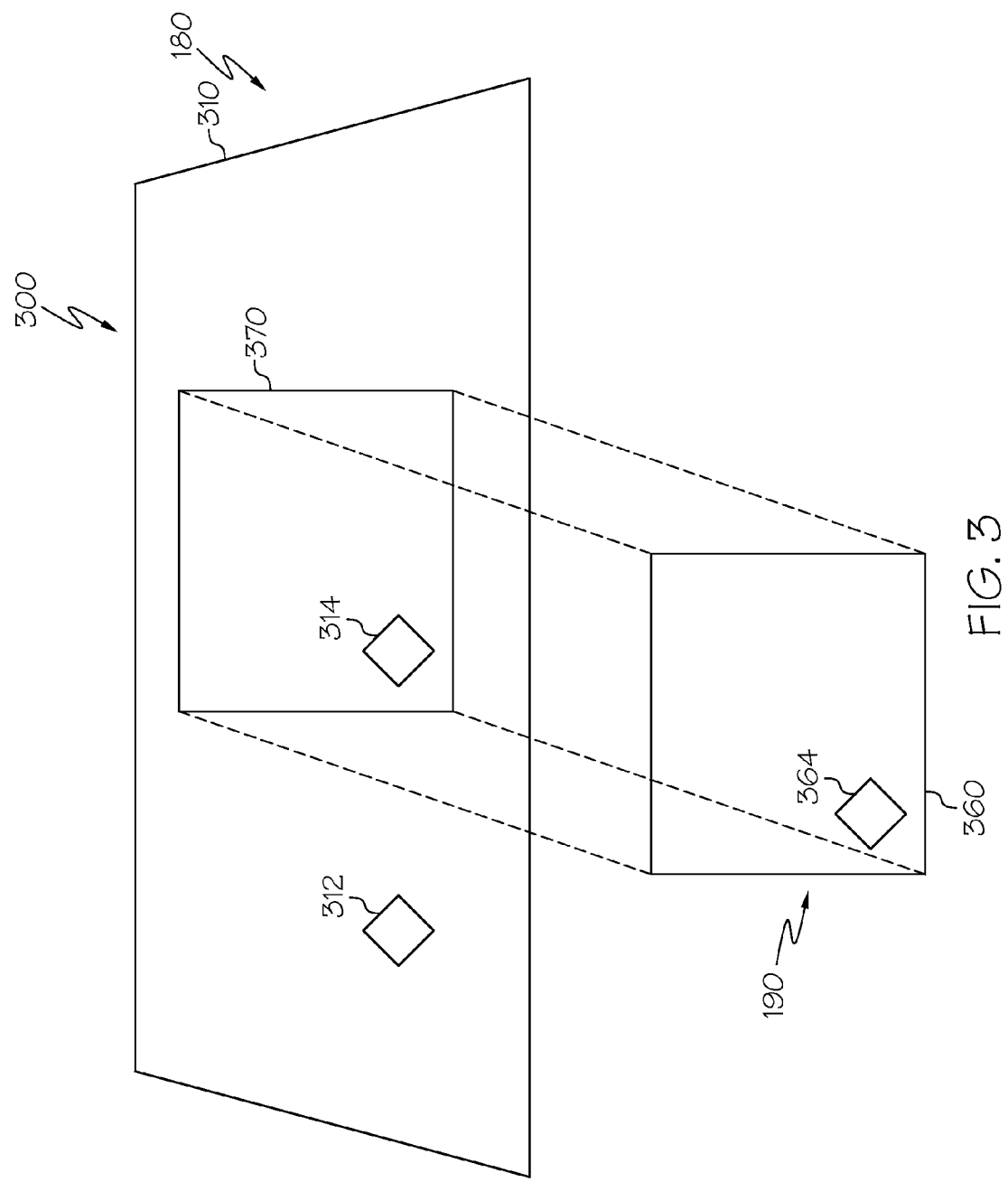
FIG. 3 is a visual display generated by the aircraft system of FIG. 1 in accordance with an exemplary embodiment.

FIG. 3 is a visual display 300 that may be rendered by the system 100 of FIG. 1. As noted above, the system 100 may include one or more types of display systems 170, including the fixed HUD system 180 and/or the NTE display system 190 used in combination or individually. In order to provide clarity to the description of the exemplary embodiments below, FIG. 3 has been separated into a first display portion 310 and a second display portion 360. The first display portion 310 corresponds to the symbology and/or images rendered on the fixed HUD system 180, and the second display portion 360 corresponds to the symbology and/or images rendered on the NTE display system 190. In practice, these display portions 310, 360 would overlay one another (e.g., portion 360 over portion 310 from the perspective of the operator) to provide a single image or view.

The first display portion 310 is sized to represent the entire or overall field of view of the fixed HUD system 180, which in this embodiment corresponds to the span of the windshield of the aircraft. Similarly, the second display portion 360 represents the field of view of the NTE display system 190 relative to the windshield of the aircraft. Typically, the field of view of the second display portion 360 of the NTE display system 190 is a sub-set of the larger field of view provided by the first visual display portion 310 of the fixed HUD system 180, as indicated by the reference lines that extend between the portions 310, 360. However, given the limits of natural operator vision, an operator may only clearly view a portion of the first display portion 310 at a given point in time. This portion may be referred to as a conical field of view of primary vision, while the remaining portions of the first display portion 310 are subject to a less clear field of view from peripheral vision. Considering the position of the NTE display system 190 near the eye of the operator, the NTE display system 190 is generally limited to the conical field of view of primary vision. As such, the viewing area of the second display portion 360 relative to the first display portion 310 may generally represent the relative size of the field of view visible by the operator in primary vision, even though the operator may additionally be able to view other portions of the first display portion 310 with peripheral vision.

Referring now to the particular symbology depicted in FIG. 3, the visual display 300 includes traffic information based on data provided from the controller 110 via the flight management system 140 and/or the warning system 150. As shown, the traffic information includes traffic element 312 and traffic element 314 on the first display portion 310. These elements 312, 314 represent the position of real-world aircraft relative to the own-ship aircraft and the surrounding environment. The second display portion 360 includes traffic element 364. In this situation, traffic element 314 and traffic element 364 represent the same aircraft such that, in the overlapping view of the operator, the traffic elements 314, 364 would appear to be a single traffic element. As such, in operation, one of the traffic elements 314, 364 may be omitted as redundant (e.g., shown on portion 310 or portion 360 instead of both).

The first display portion 310 additionally includes symbology representing a border 370 of the field of view corresponding to the NTE display system 190. In effect, the border 370 represents the boundary of the first display portion 310 that the operator is directly viewing. This information is available from the tracking unit 194 of the NTE display system 190. As a result of this arrangement, the border 370 enables the operator to visually map the scenery out of the windshield with the elements displayed on the NTE display system 190 more quickly and easily. Any type of symbology may be used to represent the border 370, including the solid lines depicted in FIG. 3, a dashed line, or any other way of defining the region corresponding to the field of view.

As discussed above, in some embodiments, the NTE display system 190 may be omitted, particularly when the fixed HUD system 180 includes the HUD tracking unit 186. Referring to FIG. 3, in such an embodiment, the second display portion 360 would be omitted. However, the first display portion 310 would still display the traffic elements 312, 314 and border 370. In this embodiment, the border 370 corresponds to the boundary of the primary vision field of view. The size and location of border 370 may be determined based in data from the HUD tracking unit 186 that monitors the position of the eyes and/or head of the operator.

As noted above, humans generally have a natural conical visual field, the extent of which may be defined as projected horizontal, vertical, and/or diagonal angles from the eyes relative to the respective distance to form the primary field of view. As such, based on the information from tracking unit 186 (and/or tracking unit 194), the current primary field of view of the operator may be determined relative to the display portion 310.

Figure 4:
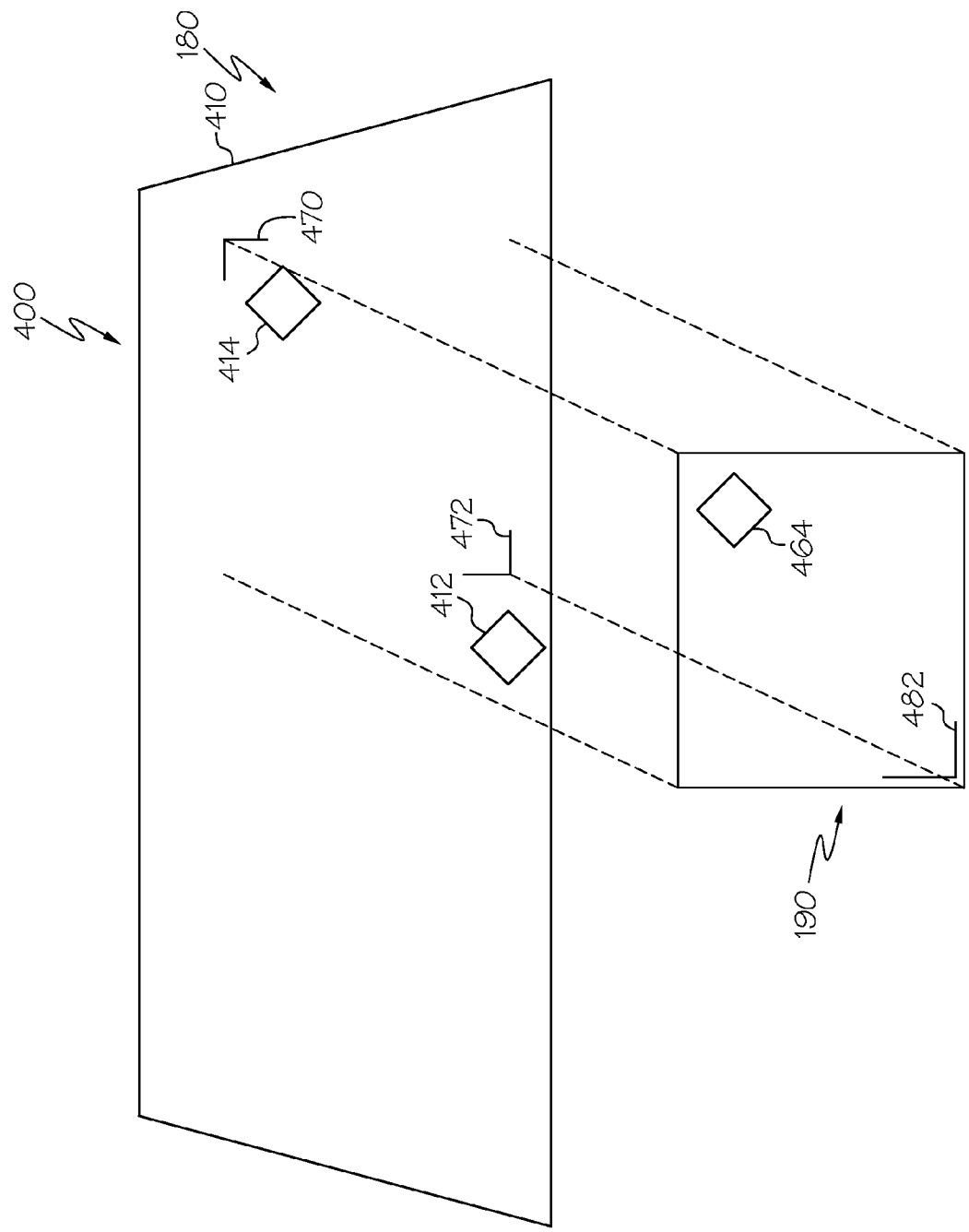
FIG. 4 is a visual display generated by the aircraft system of FIG. 1 in accordance with another exemplary embodiment.

FIG. 4 is a visual display 400 that may be rendered by the system 100 of FIG. 1 in accordance with another exemplary embodiment. Similar to FIG. 3, the visual display 400 in FIG. 4 has been separated into a first display portion 410 and a second display portion 460. The first display portion 410 corresponds to the symbology and/or images rendered on the fixed HUD system 180 and the second display portion 460 corresponds to the symbology and/or images rendered on the NTE display system 190. In practice, these display portions 410, 460 would overlay one another (e.g., portion 460 over portion 410 from the perspective of the operator) to provide a single image or view.

As above, the first display portion 410 is sized to represent the entire or overall field of view of the fixed HUD system 180, and the second display portion 460 represents the field of view of the NTE display system 190 and the primary vision field of view of the operator. Referring now to the particular symbology depicted in FIG. 4, the visual display 400 includes traffic information in the form of traffic element 412 and traffic element 414 on the first display portion 410 representing other aircraft in the proximity of the own-ship aircraft. The second display portion 360 includes traffic element 464. In this situation, traffic element 414 and traffic element 464 represent the same aircraft such that, in the overlapping view of the operator, the traffic elements 414, 464 would appear to be a single traffic element or one of the elements 414, 464 may be omitted.

The first display portion 410 additionally includes symbology representing partial border elements 470, 472 that at least partially correspond to the field of view of the NTE display system 190. In particular contrast to the embodiment of FIG. 3, the entire boundary of the primary or NTE field of view is not depicted. Instead, the border elements 470, 472 are portions of that boundary in areas that may be of interest to the operator. For example, border element 470 is proximate to traffic element 414, thereby drawing the attention of the operator to this aspect of the display portion 410, while providing the visual mapping and awareness of the traffic element 414 relative to the boundary of the primary vision and NTE field of view. Border element 472 is proximate to traffic element 412. In this scenario, traffic element 412 is not in the primary vision field of view and/or the NTE field of view. However, the border element 472 provides an indication to the operator that there may be an element of interest (e.g., a nearby aircraft represented by traffic element 412) in proximity to the own-ship aircraft.

In this exemplary embodiment, the second display portion 460 may also include one or more border elements 482, which may be displayed in addition to or as an alternative to the border elements 470, 472 of the first display portion 410. Generally, the border element 482 corresponds to a portion of the boundary of the primary vision and/or the NTE display system 190 such that, on the second display portion 460 of the NTE display system 190, this corresponds to portions of the outer edges of the second display portion 460. In one exemplary embodiment, the border element 482 may function as a warning or proximity indicator to indicate to the operator that there may be an object of interest outside of the view of the NTE display system 190. In this scenario, the border element 482 represents a proximity indicator for the aircraft represented by traffic element 412 of the first display portion 410, which is not within the field of view of the second display portion 460, but is close enough to warn the operator.

The border elements 470, 472 on the first display portion 410 and/or the border element 482 on the second display portion 460 may be generated based on information from the flight management system 140 and/or the warning system 150. As noted above, the border elements 470, 472, 482 may function as warning and/or proximity indicators in the corner(s) of the primary vision and/or NTE field of view that is closest to the respective object of interest. In some embodiments, the border elements 470, 472, 482 may have appearances that represent the nature or urgency of the indicator. For example, each border element 470, 472, 482 may have a color or appearance representing a proximity warning when the object is merely on the periphery of the view, a color or appearance representing a caution warning when the object is closer to the primary vision field of the view, and a color or appearance representing a more urgent warning when the object is within the primary field of view.

In addition or as an alternative to the fixed HUD system 180 and/or NTE display system 190 discussed above, a border (e.g., border 370) and/or border elements (border elements 470, 472, 482) may also be displayed on non-see-through displays, such as a virtual window or a head-down display to provide a representation of the primary vision field of view of the operator. Such borders or border elements may have characteristics similar to those discussed above.

Accordingly, exemplary embodiments discussed above provide improved representations of the primary field of view on a display, including a fixed HUD display system and/or an NTE display system. This enables improved situational awareness regarding the objects and environment viewed outside of the aircraft, thereby improving efficiency and safety without requiring additional head-down time. In addition to the systems discussed above, exemplary embodiments may be further embodied as methods for implementing the functions of the systems described above.

Embodiments of the present invention may be described in terms of functional block diagrams and various processing steps. It should be appreciated that such functional blocks may be realized in many different forms of hardware, firmware, and or software components configured to perform the various functions. For example, embodiments of the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A visual display system for a vehicle having a windshield, comprising:
 a controller configured to receive information associated with an operating environment of the vehicle and to generate display commands representing the operating environment;
 a first operator tracking unit configured to collect data associated with a primary vision field of view of an operator; and
 a first head-up display system coupled to the controller and configured to receive the display commands, the first head-up display system comprising a first display unit configured to display at least a portion of a border representing a boundary of the primary vision field of view of the operator and first symbology representing the operating environment of the vehicle, wherein the first head-up display system is a fixed head-up display system and the first display unit is proximate to the windshield of the vehicle.

2. The visual display system of claim 1, wherein the first display unit is configured to display only a corner of the border.

3. The visual display system of claim 1, wherein the first display unit is configured to display an entirety of the border.

4. The visual display system of claim 1, wherein the first display system is a first head-up display system.

5. The visual display system of claim 4, wherein the first head-up display system is a near-to-eye display system and the first operator tracking unit is part of the near-to-eye display system.

6. The visual display system of claim 1, further comprising a second head-up display system as a near-to-eye display system coupled to the controller and configured to receive the display commands, the second head-up display system comprising a second display unit configured to display second symbology representing the operating environment of the vehicle.

7. The visual display system of claim 6, wherein the first operator tracking unit is part of the near-to-eye display system, and wherein the primary vision field of view corresponds to a near-to-eye display field of view.

8. The visual display system of claim 1, wherein the first operator tracking unit is configured to collect a head orientation and head position of the operator as the data associated with the primary vision field of view.

9. The visual display system of claim 1, wherein the vehicle is an aircraft and the operating environment includes aircraft traffic with a first external aircraft, and wherein the first symbology includes a traffic element representing the first external aircraft at least when the first external aircraft is within the primary vision field of view.

10. The visual display system of claim 9, wherein, when the first external aircraft is outside the primary vision field of view, the border includes only a corner of the border closest to a position of the first external aircraft.

11. The visual display system of claim 9, wherein the at least the portion of the border has a variable appearance based on a position of the first external aircraft relative to the primary vision field of view.

12. A method for providing a visual display to an operator of a vehicle having a windshield, the method comprising:
collecting information associated with an operating environment;
determining a primary vision field of view of the operator based on data from a first operator tracking unit; and
rendering, on a first display system, first symbology representing the operating environment of the vehicle and at least a portion of a border representing a boundary of the primary vision field of view of the operator,
wherein the first display system is a fixed head-up display system and the first display unit is proximate to the windshield of the vehicle.

13. The method of claim 12, wherein the rendering step includes rendering only a corner of the border on the first display system.

14. The method of claim 12, wherein the rendering step includes rendering an entirety of the border on the first display system.

15. The method of claim 12, wherein the determining step includes determining the primary vision field of view of the operator based on data from the first operator tracking unit that forms part of a near-to-eye display system.

16. The method of claim 12 , wherein the vehicle is an aircraft and wherein the collecting step includes collecting information associated with aircraft traffic within the aircraft environment that includes a first external aircraft, and
wherein the rendering step includes rendering the first symbology to include a traffic element representing the first external aircraft at least when the first external aircraft is within the primary vision field of view.

17. The method of claim 16, wherein the rendering step includes rendering, when the first external aircraft is outside the primary vision field of view, only a corner of the border closest to a position of the first external aircraft.

18. The method of claim 16, wherein the rendering step includes rendering the at least the portion of the border with a variable appearance based on a position of the first external aircraft relative to the primary vision field of view.

19. A visual display system for a vehicle having a windshield, comprising:
a controller configured to receive information associated with an operating environment of the vehicle and to generate display commands representing the operating environment;
a near-to-eye display system coupled to the controller and configured to receive the display commands, the near-to-eye display system comprising a first operator tracking unit configured to collect data associated with a primary vision field of view of an operator as an NTE (near-to-eye) field of view and a first display unit configured to display first symbology representing the operating environment of the vehicle within the NTE field of view; and
a fixed head-up display system coupled to the controller and configured to receive the display commands, the fixed head-up display system comprising a second display unit proximate to the windshield of the vehicle configured to display at least a portion of a border representing a boundary of the NTE field of view and second symbology representing the operating environment of the vehicle.

* * * * *